Aug. 20, 1940.    J. F. DIETRICH    2,211,767
DRYING APPARATUS
Filed Jan. 24, 1938    3 Sheets-Sheet 1
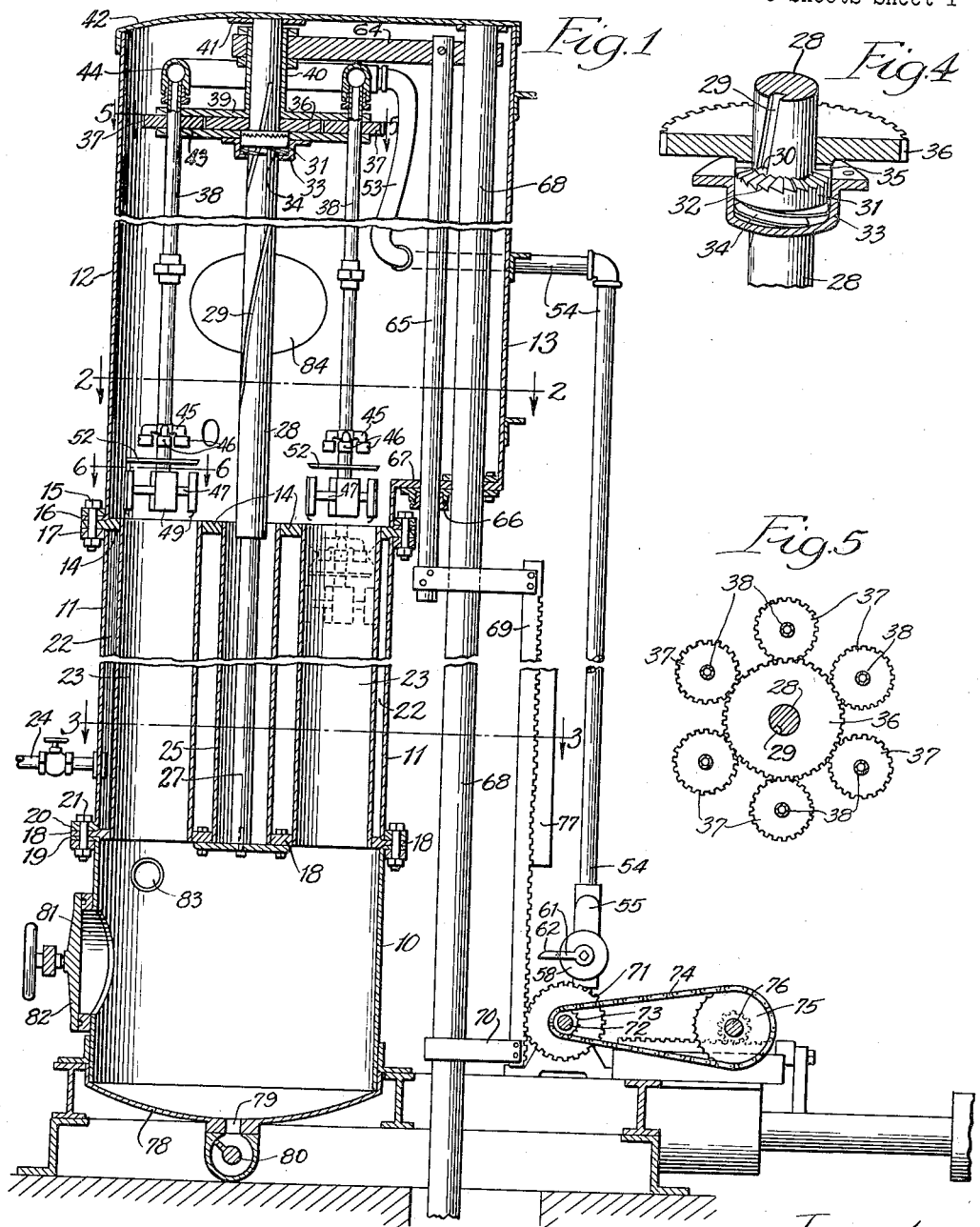
Inventor:
Julius F. Dietrich,
By Banning & Banning
Attorneys.

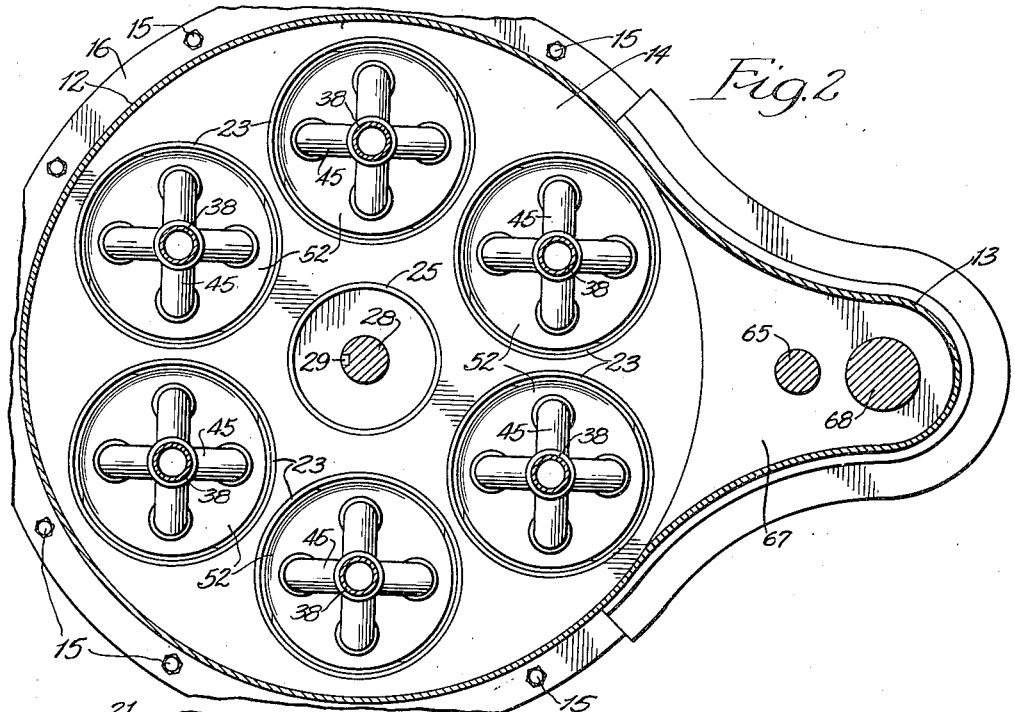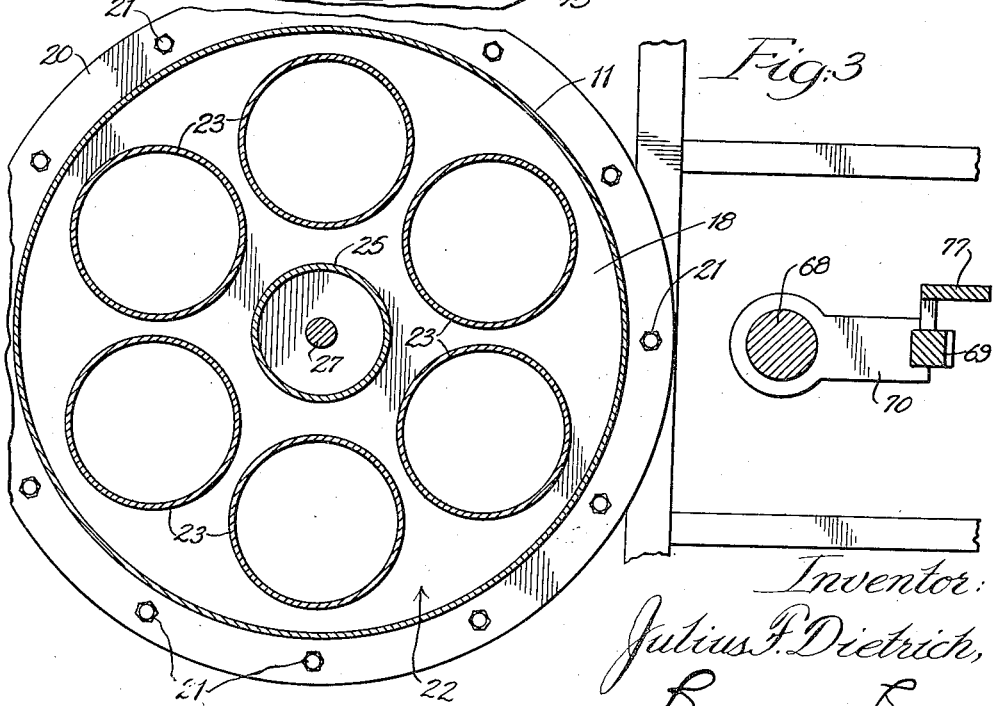

Aug. 20, 1940.                J. F. DIETRICH                2,211,767
                            DRYING APPARATUS
                         Filed Jan. 24, 1938          3 Sheets-Sheet 3
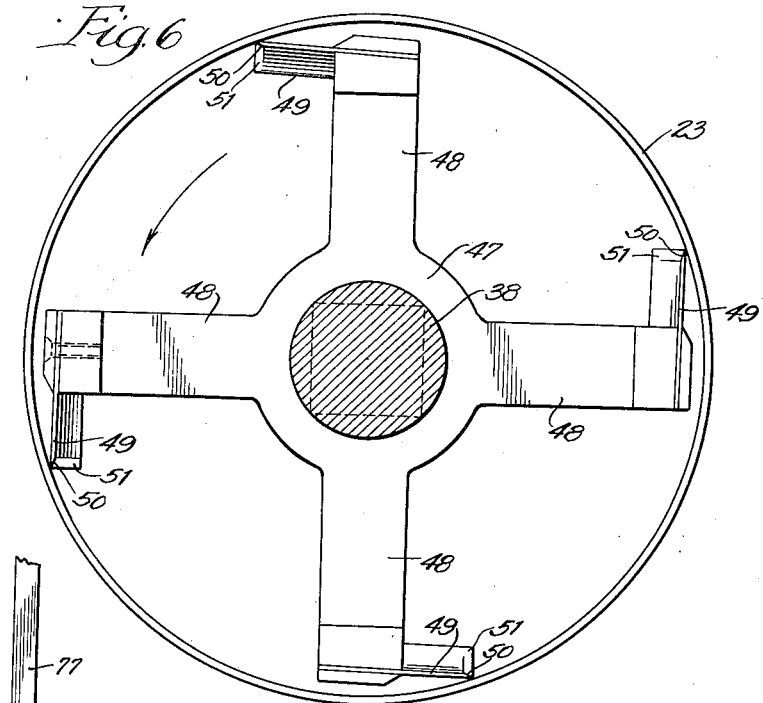
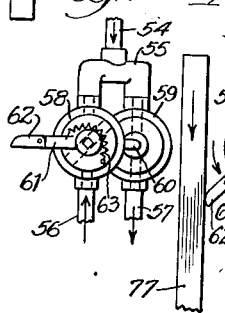 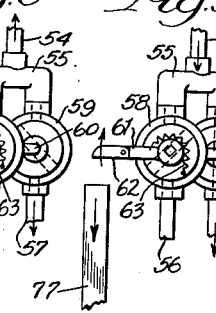 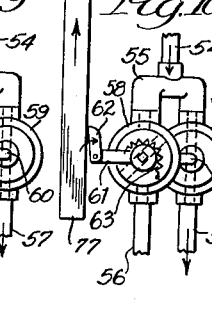 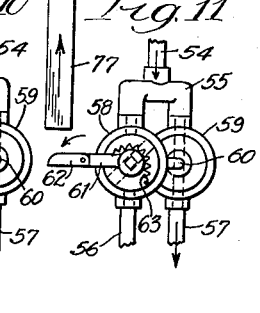 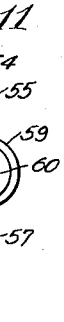
Inventor:
Julius F. Dietrich,
By Banning & Banning
Attorneys.

Patented Aug. 20, 1940

2,211,767

UNITED STATES PATENT OFFICE 2,211,767

DRYING APPARATUS

Julius F. Dietrich, Sheboygan, Wis.; Richard H. Dietrich administrator of said Julius F. Dietrich, deceased Application January 24, 1938, Serial No. 186,614

15 Claims. (Cl. 159—5)

The apparatus of the present invention is designed primarily for the drying of milk, although it is adapted for other uses. The principal object and purpose of the invention is to so construct the apparatus as to provide a relatively large surface area for the deposition of a liquid, which for the purposes of the present description will be referred to as milk.

A further object of the invention is to provide for the complete enclosure of the drying surfaces, which are of tubular configuration, so that the milk will not be exposed to contamination and in order that the heat may be conserved to the utmost extent.

The invention in particular relates to the form and arrangement of the tubular drying surfaces and the enclosure provided therefor; to the arrangement and means for operating the rotary scrapers which remove the dried milk from the surfaces upon which the milk is deposited; to the form and arrangement of the spray nozzles and the means for supplying milk thereto; to the means for imparting movement to the operating parts, and to the general structure and arrangement of the apparatus as a whole.

Further objects and details will appear from the description of the invention in conjunction with the accompanying drawings, wherein—

Figure 1 is a sectional elevation of the entire apparatus;

Fig. 2 is a sectional plan view taken on line 2—2 of Fig. 1;

Fig. 3 is a sectional plan view taken on line 3—3 of Fig. 1;

Fig. 4 is a perspective detail partially in section of the ratchet mechanism for imparting rotation to the scraper knives and nozzles;

Fig. 5 is a fragmental plan view showing the gear train for intermittently rotating the knives and nozzles;

Fig. 6 is an enlarged detail of the knives and mountings therefor; and

Figs. 7 to 11 inclusive are perspective details of the trip mechanism for actuating the valves at various stages in the operation.

The structure as a whole is housed within a casing comprising a cylindrical base section 10, a cylindrical intermediate section 11, and an upper section 12 which is pear shaped in cross section, being provided on one side with a protuberant portion 13 which affords a housing for certain of the operating parts presently to be described.

The intermediate and upper sections of the casing are separated by a cross partition wall 14, against which the adjoining ends of the intermediate and upper casing sections abut and are held by the provision of bolts 15 which pass through a flange 16 on the rim of the upper section and a ring 17 which is secured to the rim of the intermediate section.

The intermediate section of the casing is separated from the lower section by a lower partition wall 18 against which the ends of the respective sections abut, the lower section being provided with a flange 19 and the upper section with a connected ring 20, through which bolts 21 are entered for securing the sections rigidly together and in a manner to seal the interior of the casing against the admission of air.

The upper and lower partition walls, in conjunction, provide an intermediate heating chamber 22 through which extend a group of tubes 23, six being shown in the present instance for purposes of illustration. The tubes are open at their ends, and their inner walls afford the drying surfaces for the deposition of the milk which is dried by the heat conducted through the relatively thin walls of the tubes which are preferably of copper, which is non-corrosive and a good conductor of heat.

The heating chamber is preferably heated by steam admitted through a pipe 24, or in any other suitable manner, and if desired, a partial vacuum may be maintained within the heating chamber in order to circulate steam at a relatively low temperature, so that the drying will be carried on under conditions which will not impair the flavor or quality of the resulting product.

In addition to the drying tubes 23, a well 25 is provided, which extends through the center of the heating chamber and is closed at the lower end by a plate 26 which furnishes a mounting for a fixed post or column 27, which is enlarged at its upper end 28 and provided with a helical groove 29 which receives a dog 30 protruding inwardly from a spring backed ratchet ring 31 having saw teeth 32 on its upper face, which teeth present abrupt faces in one direction only.

The ratchet ring is mounted within a flanged cup 33 which encircles the post 28 and affords a housing for the spring 34 which bears against the ratchet ring and tends to force the same upwardly with a light degree of pressure. The ratchet ring coacts with ratchet teeth 35 on the lower face of a center spur gear 36 which meshes with a group of spur pinions 37 (six in number as shown), each of the spur pinions being keyed upon a tubular shaft 38 which shafts are axially aligned with the centers of the drying tubes and are adapted to be lowered into and raised therefrom concurrently with the imparting of rotation to each of the tubular shafts.

Each of the tubular shafts is journalled through an upper plate 39 secured at the lower end of a sleeve 40 which encircles the upper end 28 of the post 27, which post is rigidly supported at its upper end within a plate 41 secured to the roof plate 42 which constitutes a closure for the upper end of the casing.

The tubular shafts 38 are also journalled through a ring-shaped plate 43 to which the cup 33 is secured, which arrangement serves to hold and steady the tubular shafts and maintain them in properly aligned relation with the respective drying tubes.

The group of tubular shafts 38 terminate in a ring-shaped header 44, which supplies milk or other liquid to the interior of the tube shafts, so that said shafts afford conduits for the conveying of milk to the points of discharge, which in each instance is through a group of radially arranged nozzles 45 carried by the respective tube shafts near the lower ends thereof, each nozzle being provided with an outwardly directed aperture 46 adapted to discharge liquid directly against the interior wall of the associated drying tube when the nozzle group has been lowered thereinto in a manner presently to be described.

Each of the tube shafts, at its lower end and below the nozzle group, carries a spider 47 having radially arranged arms 48, and each arm at its outer end affords a mounting for a scraper knife blade 49 having a cutting edge 50 which extends vertically, except at its lower terminus 51, which is inturned to afford an easy entrance into the mouth of the drying tube.

The knife edges stand in oblique relation to the inner surface of the tube wall and present their edges forwardly in the direction of rotation of the spider which carries the group of knives, so that when the tube shaft is lowered and simultaneously rotated, the knives will closely engage the inner surface of the tube and scrape and remove the dry milk or other dried material accumulated thereon.

Between the knife group and the nozzle group is located a shallow drip pan 52 which serves to arrest any drippings from the nozzles when elevated.

Milk is supplied to the header 44 through a flexible hose 53, which connects through the wall of the upper section of the casing with an exteriorly located supply pipe 54. The supply pipe has its lower end entered into a U-shaped coupling 55, one branch of which receives a supply pipe 56 and the other branch of which receives an exhaust pipe 57.

As shown in Figs. 7 to 11 inclusive, the supply pipe 56 is controlled by a valve 58 and the exhaust pipe by a valve 59, both valves being mounted upon a common valve stem 60, so that the two valves will be rotated in unison. The valve 58 carries an arm 61 to the outer end of which is pivoted a knife-blade trip finger 62, which is rigid against yielding to a downward thrust, but will yield, as shown in Fig. 10, upon an upward thrust.

The valve arm 61 operates against a coil spring 63, so that the supply valve will normally occupy the closed position shown in Fig. 7 with the exhaust valve occupying the open position indicated in the same figure.

The group of tubular arms with the mountings provided therefor are adapted to be raised and lowered upon the center post or standard 28 by the raising and lowering of an arm 64, which engages the upper end of the sleeve 40, which also supports the gear train and associated parts, and vertical movements are imparted to the arm 64 by a thrust rod 65, which is entered through a packing 66 in the offset bottom wall 67 of the upper section of the casing. The arm 64 is guided by engagement with a guide rod 68 which stands in parallel adjacent relation to the thrust rod 65. The thrust rod at its lower end carries a rack 69 which at its lower end is provided with an arm 70 which is guided upon the guide rod 68. The rack meshes with a driving gear 71 on a shaft 72 carrying a sprocket 73 upon which is mounted a sprocket chain 74 driven from a sprocket wheel 75 on a motor shaft 76.

The rack is provided with a trip bar 77 which as the rack descends will engage the trip finger 62 in the manner shown in Figs. 7 to 11 inclusive, and on its descent will engage the trip finger and depress it as in Figs. 7 and 8 so long as the finger is in contact with the bar, and will allow it to return to the normal position shown in Fig. 9 when the trip bar descends to its lowermost position. Thereafter, upon the return movement of the trip bar, it will throw back the trip finger 62 so that the upward movement of the trip bar will be ineffective to disturb the normal position of the valves, which as shown is one in which the milk supply line is closed and the vacuum or exhaust line is open.

The bottom section of the casing affords a chamber for the accumulation and removal of the dried product, the section being closed by a dish-shaped base plate 78 having a discharge aperture 79 in its center, below which is located a worm feed 80 which serves to convey the dried material to the point of discharge. A man-hole 81 closed by a cover 82 affords access to the interior of the base portion of the casing, and a sight glass 83 permits visual inspection as occasion may require. Access into the upper portion of the casing is permitted through a man-hole 84. Although no means are shown for exhausting the vapors from the interior of the casing, this forms no portion of the present invention, since any conventional means may be employed for this purpose.

*Operation*

In operation, steam or other heating medium will be admitted to the interior of the heating chamber, and will serve to heat the walls of the drying tubes to the desired degree. With the tube shafts and associated parts elevated as in Fig. 1, the milk supply will be cut off, and the interior of the casing, with the exception of the heating chamber, may be subjected to partial vacuum by the opening of the exhaust line.

When rotation is imparted to the sprocket 71, the rack will be drawn downwardly and the entire operating assembly will be lowered, with the dog 30 (Fig. 4) in engagement with the helical groove 29, which causes a rotation of the spring backed ratchet ring 31 which will engage with the ratchet teeth on the center gear 36. Rotation will thus be imparted to each of the pinions 37 and the tube shafts 38 with the parts carried thereby. Thus, as the assembly descends, the respective knife groups and spray nozzles will enter the respective drying tubes while rotating, and at the instant when the spray nozzles enter the mouths of the respective tubes the valves will be actuated to admit milk or other liquid through the supply line and simultaneously cut off the exhaust line.

Thus, as the spray nozzles descend, they will rotate to discharge the milk in the form of a fine spray upon the heated surfaces of the drying tubes, so that after the first cycle of operations the milk thus deposited will be dried and in condition for removal by the operation of the knives. On the second, and all succeeding operations, the knives, as they rotate with their edges presented forwardly, will scrape off the dried milk previously deposited in advance of the discharge of a new charge of milk from the nozzles, each preceding charge being removed in preparation for a new deposit of milk.

Although the knives and nozzles rotate on the descending movement, they will be held against rotation on the return movement, by reason of the fact that the teeth of the ratchet ring 31 will slip freely under the teeth 35 on the center gear 36, the spring 34 yielding to the extent necessary to permit such slippage. Since the knives stand in non-rotating relation on the upward movement, with their cutting edges aligned with the direction of movement, the knives will not have the effect on the upward movement of disturbing the film of milk previously deposited on the downward stroke, so that the upward movement will be an idle or ineffective movement. The valve arrangement also is one which cuts off the discharge of the milk before the upward movement begins, so that nothing will occur during this period which will disturb the drying operation being performed on the surfaces of the drying tubes.

As the film of dried milk is scraped free by the rotation of the knives, the flaky material will fall downwardly into the lower section of the casing, which serves as an accumulating chamber and will be removed therefrom by the action of the worm feed and discharged at some convenient point.

By properly proportioning the length of the heating tubes with relation to the periods of time embraced in the cycle of operations, it is possible to so conduct the operations that a sufficient period will elapse between each deposit of milk on the tubular drying surfaces to permit the necessary drying before the material is removed by the descent of the knives, and it is also possible to so actuate the mechanism as to provide for a quick return movement after the deposition of a charge of milk, and an interval of rest thereafter to permit the charge to be fully dried before its removal. It will be understood, therefore, that the timing of the device will depend upon the extent of the drying required and the nature of the liquid dealt with.

The arrangement is one which is extremely compact, and in view of the fact that the apparatus stands vertically, a minimum of floor space will be required, and if desired a series of driers can be grouped together and operated from a common source of power.

By providing tubular drying surfaces of the character described, the area provided for the deposition of the milk can be greatly increased in comparison with the surface afforded by a drum drier of comparable dimensions, and in view of the fact that the drying surface is afforded by tubes which stand stationary there will be no necessity for the heavy and rugged construction commonly employed in drum driers, or for an expenditure of the amount of power required in the operation of such devices.

Furthermore, the present apparatus is one in which the principal working parts are completely enclosed, and in which the supply and distribution of the milk or other liquid is automatically controlled, so that no opportunity is afforded for the contamination of the product or the befouling of the apparatus by drippings or the like, since the supply of milk is automatically cut off as the nozzles are lifted from the drying tubes and subjected to the suction of the exhaust line, any slight drippings from the nozzles being caught by the pans provided for such purpose.

Although the invention has been described with full particularity, it will be understood that the number and arrangement of the drying tubes may be increased or diminished, and the means for rotating and lifting the knives and nozzles may be modified, and that other details may be altered without departing from the spirit of the invention.

I claim:

1. In a drier, the combination of a casing, a plurality of open-ended drying tubes within the casing having their intake ends at a higher elevation than their discharge ends and adapted to have their walls heated by a heating medium admitted to the casing and to present their inner surfaces for the deposition of liquid to be dried, a plurality of tubular shafts aligned with the axes of the drying tubes and each having scraper means mounted upon its lower end, and spraying means mounted behind the scraper means, means for admitting liquid to the tubular shafts for discharge through the spraying means, and means for imparting endwise movement to the tubular shafts and adapted to bring the scraper means into scraping relation with the interior walls of the respective tubes to remove dried material therefrom concurrently with the deposition of a new charge of liquid upon the inner surfaces of the drying tubes, and means for imparting rotation to the spraying tubes concurrently with the downward movement thereof through the respective drying tubes and preventing rotation during the upward movement of the spraying tubes.

2. In a drier, the combination of a casing, a plurality of drying tubes within the casing and standing in parallel relation to one another with their intake ends at a higher elevation than their discharge ends and adapted to have their inner surfaces heated by a heating medium admitted to the casing, a standard mounted in adjacent relation to the tubes, a scraping device for each of the tubes and a header mounted upon the standard for supporting the group of scraping devices for longitudinal movement through the respective tubes and into contact with dried material upon the inner surfaces of the tubes, means for effecting such longitudinal movement, spraying means associated with each of the scraper means and movable therewith behind the scraper means to deposit liquid on the tube surfaces after the removal of dried material previously deposited, and means for imparting rotary movements to the scraper means concurrently with the movement thereof through the tubes in a downward direction.

3. In a drier, the combination of a casing, a plurality of drying tubes within the casing and standing in parallel relation to one another with their intake ends at a higher elevation than their discharge ends and adapted to have their inner surfaces heated by a heating medium admitted to the casing, a standard mounted in adjacent relation to the tubes, a scraping device for each of the tubes and a header slidably mounted upon the standard for supporting the group of scraping devices and for longitudinal movement through the respective tubes and into contact with dried material upon the inner surfaces of the tubes, means for effecting such longitudinal movement, spraying means coacting with the respective scrapers for depositing liquid upon the tube surfaces behind the scraper means, and means for imparting rotary movements to the scraper means concurrently with the movement thereof through the tubes in a downward direction and adapted to prevent rotary movement of the scraper means on the ascending movement of the scraper means.

4. In a drier, the combination of a casing, a plurality of drying tubes within the casing and standing in parallel relation to one another with their intake ends at a higher elevation than their discharge ends and adapted to have their inner surfaces heated by a heating medium admitted to the casing, a fixed standard mounted in intermediate relation to the tubes, a scraping device for each of the tubes and means slidably mounted upon the standard for supporting the group of scraping devices for longitudinal movement through the respective tubes and into contact with dried material upon the inner surfaces of the tubes, means for effecting such longitudinal movement, spraying means associated with each of the scraper means and movable therewith behind the scraper means to deposit liquid on the tube surfaces after the removal of dried material previously deposited, and means for imparting rotary movements to the scraper means concurrently with the longitudinal movement thereof through the tubes in a downward direction and adapted to prevent rotary movement of the scraper means on the ascending movement of the scraper means.

5. In a drier, the combination of a casing, a drying tube located within the casing and adapted to have its walls heated by a heating medium admitted to the interior of the casing, a standard within the casing located in parallel relation to the drying tube and exteriorly thereof, a tubular shaft in aligned relation with the axis of the drying tube and mountings carried by the standard for guiding the shaft during endwise movement with respect to the standard, knife mechanism carried by the tubular shaft at the lower end thereof and adapted to engage the inner surface of the drying tube for removal of dried material deposited thereon, means carried by the standard for imparting rotary movements to the tubular shaft concurrently with the advance movement thereof through the drying tube, and a spray nozzle carried by the tubular shaft behind the knife mechanism for spraying liquid upon the interior surface of the drying tube, means for imparting endwise advance and return movements to the tubular shaft and mechanisms carried thereby, and means for supplying liquid to the tubular shaft for discharge through the spray nozzle.

6. In a drier, the combination of a casing, a drying tube located within the casing and adapted to have its walls heated by a heating medium admitted to the interior of the casing, a standard within the casing located in parallel relation to the drying tube and exteriorly thereof, a tubular shaft in aligned relation with the axis of the drying tube and mountings carried by the standard for guiding the shaft during endwise movement with respect to the standard, knife mechanism carried by the tubular shaft at the lower end thereof and adapted to engage the inner surface of the drying tube for removal of dried material deposited thereon, means carried by the standard for imparting rotary movements to the tubular shaft concurrently with the advance movement thereof through the drying tube and adapted to prevent rotary movements on the return movement of the tubular shaft, and a spray nozzle carried by the tubular shaft behind the knife mechanism for spraying liquid upon the interior surface of the drying tube, means for imparting endwise advance and return movements to the tubular shaft and mechanisms carried thereby, and means for supplying liquid to the tubular shaft for discharge through the spray nozzle.

7. In a drier, the combination of a casing, a drying tube located within the casing and adapted to have its walls heated by a heating medium admitted to the interior of the casing, a standard within the casing located in parallel relation to the drying tube and exteriorly thereof, a tubular shaft in aligned relation with the axis of the drying tube and mountings carried by the standard for guiding the shaft during endwise movement with respect to the standard, knife mechanism carried by the tubular shaft at the lower end thereof and adapted to engage the inner surface of the drying tube for removal of dried material deposited thereon, means carried by the standard for imparting rotary movements to the tubular shaft concurrently with the advance movement thereof through the drying tube, and a spray nozzle carried by the tubular shaft behind the knife mechanism for spraying liquid upon the interior surface of the drying tube, means for imparting endwise advance and return movements to the tubular shaft and mechanisms carried thereby, and means for supplying liquid to the tubular shaft for discharge through the spray nozzle, and automatic means for controlling the flow of liquid therethrough and adapted to admit liquid during the advance movement of the nozzle and shut off the supply of liquid during the return movement of the nozzle.

8. In a drier, the combination of a casing, a drying tube located within the casing and adapted to have its walls heated by a heating medium admitted to the interior of the casing, a standard within the casing located in parallel relation to the drying tube and exteriorly thereof, a tubular shaft in aligned relation with the axis of the drying tube and mountings carried by the standard for guiding the shaft during endwise movement with respect to the standard, knife mechanism carried by the tubular shaft at the lower end thereof and adapted to engage the inner surface of the drying tube for removal of dried material deposited thereon, means carried by the standard for imparting rotary movements to the tubular shaft concurrently with the advance movement thereof through the drying tube and adapted to prevent rotary movements on the return movement of the tubular shaft, and a spray nozzle carried by the tubular shaft behind the knife mechanism for spraying liquid upon the interior surface of the drying tube, means for imparting endwise advance and return movements to the tubular shaft and mechanisms carried thereby, and means for supplying liquid to the tubular shaft for discharge through the spray nozzle, and automatic means for controlling the flow of liquid therethrough and adapted to admit liquid during the advance movement of the nozzle and shut off the supply of liquid during the return movement of the nozzle.

9. In a drier, the combination of a casing, an open-ended drying tube within the casing adapted to have its walls heated by a heating medium admitted to the casing, a tubular shaft standing in axial aligned relation with the drying tube, a standard within the casing extending in parallel relation to the drying tube, mountings for the tubular shaft carried by the standard, means engaging said mountings for imparting advance and return movements thereto, a gear slidably and rotatably mounted upon the standard, means for imparting rotation to the gear during endwise advance movement thereof along the standard, including a spiral and a member associated with the gear and engaging said spiral, a pinion on the tubular shaft in mesh with the gear first mentioned, means for admitting liquid to the interior of the tubular shaft, a cutting blade carried by the tubular shaft in position to engage the inner surface of the drying tube and remove dried material deposited thereon when rotation is imparted to the cutting blade, and nozzle means carried by the tubular shaft behind the cutting blade for spraying liquid upon the inner surface of the drying tube behind the cutting blade.

10. In a drier, the combination of a casing, an open-ended drying tube within the casing adapted to have its walls heated by a heating medium admitted to the casing, a tubular shaft standing in axial aligned relation with the drying tube, a standard within the casing extending in parallel relation to the drying tube, mountings for the tubular shaft carried by the standard, means engaging said mountings for imparting advance and return movements thereto, a gear slidably and rotatably mounted upon the standard, means for imparting rotation to the gear during endwise advance movement thereof along the standard, including a spiral and a member associated with the gear and engaging said spiral and adapted to be disengaged from the gear during the return movement thereof, a pinion on the tubular shaft in mesh with the gear first mentioned, means for admitting liquid to the interior of the tubular shaft, a cutting blade carried by the tubular shaft in position to engage the inner surface of the drying tube and remove dried material deposited thereon when rotation is imparted to the cutting blade, and nozzle means carried by the tubular shaft behind the cutting blade for spraying liquid upon the inner surface of the drying tube behind the cutting blade.

11. In a drier, the combination of a casing, an open-ended drying tube within the casing adapted to have its walls heated by a heating medium admitted to the casing, a tubular shaft standing in axially aligned relation with the drying tube, a standard within the casing extending in parallel relation to the drying tube, mountings for the tubular shaft carried by the standard, means engaging said mountings for imparting advance and return movements thereto, a gear slidably and rotatably mounted upon the standard, means for imparting rotation to the gear during endwise advance movement thereof along the standard, including a spiral and a member associated with the gear and engaging said spiral, a pinion on the tubular shaft in mesh with the gear first mentioned, means for admitting liquid to the interior of the tubular shaft, a cutting blade carried by the tubular shaft in position to engage the inner surface of the drying tube and remove dried material deposited thereon when rotation is imparted to the cutting blade, and nozzle means carried by the tubular shaft behind the cutting blade for spraying liquid upon the inner surface of the drying tube behind the cutting blade, and automatic means for permitting the flow of liquid to the nozzle during the advance movement thereof and cutting off the supply of liquid during the return movement.

12. In a drier, the combination of a casing, an open-ended drying tube within the casing adapted to have its walls heated by a heating medium admitted to the casing, a tubular shaft standing in axially aligned relation with the drying tube, a standard within the casing extending in parallel relation to the drying tube, mountings for the tubular shaft carried by the standard, means engaging said mountings for imparting advance and return movements thereto, a gear slidably and rotatably mounted upon the standard, means for imparting rotation to the gear during endwise advance movement thereof along the standard, including a spiral and a member associated with the gear and engaging said spiral and adapted to be disengaged from the gear during the return movement thereof, a pinion on the tubular shaft in mesh with the gear first mentioned, means for admitting liquid to the interior of the tubular shaft, a cutting blade carried by the tubular shaft in position to engage the inner surface of the drying tube and remove dried material deposited thereon when rotation is imparted to the cutting blade, and nozzle means carried by the tubular shaft behind the cutting blade for spraying liquid upon the inner surface of the drying tube behind the cutting blade, and automatic means for permitting the flow of liquid to the nozzle during the advance movement thereof and cutting off the supply of liquid during the return movement.

13. In a drier, the combination of a liquid drying tube, means for heating said tube, a spraying device mounted to deposit a limited quantity of liquid to be dried on the interior surface of said tube, a knife presenting its cutting edge forwardly and in substantial alignment with the axis of the tube, and means to reciprocate the knife edgewise through the interior of the drying tube and to rotate the knife during one direction only of movement thereof to scrape the dried material from the inner surface of the drying tube.

14. In a drier, the combination of a casing, means for admitting a heating medium to said casing, a plurality of open ended liquid drying tubes within the casing having their intake ends at a higher elevation than their discharge ends and adapted to have their walls heated by said heating medium and to present their inner surfaces for the deposition of liquid to be dried thereon, a plurality of tubular shafts aligned respectively with the axes of the drying tubes and each having scraper means mounted upon its lower end and spraying means mounted behind the scraper means, means for admitting liquid to the tubular shafts for discharge through the spraying means, and means for imparting endwise movement to the tubular shafts to bring the scraper means into contacting relation with the interior walls of the respective tubes on the downward movement of the scraper means to remove the dried material previously deposited thereon by the spraying means concurrently with the deposition behind the scraper means of a new charge of liquid to be dried, and means adapted to impart rotation to the tubular shafts and scraper means concurrently with the downward movement only thereof through the respective drying tubes to effect scraping during such downward movement and to suspend rotation during the upward movement.

15. In a drier, the combination of a casing, means for admitting a heating medium to said casing, a plurality of drying tubes within the casing and standing in parallel relation to one another with their intake ends at a higher elevation than their discharge ends and adapted to have their inner surfaces heated by said heating medium, a standard mounted in intermediate relation to the tubes, a scraping device for each of the tubes, a header mounted upon the standard for supporting the group of scraping devices and adapted to reciprocate to move the scraping devices longitudinally through the respective tubes in a manner to scrape previously deposited dried material from the inner surfaces of the tubes while moving in the downward direction and to suspend the scraping action while moving in the upward direction, spraying means coacting with the respective scrapers for depositing liquid upon the tube surfaces behind the scraper means, and means for imparting reciprocating movements to the header.

JULIUS F. DIETRICH.